US008406166B2

(12) United States Patent
Spain, Jr.

(10) Patent No.: US 8,406,166 B2
(45) Date of Patent: *Mar. 26, 2013

(54) LOCATION ESTIMATION OF WIRELESS TERMINALS THROUGH PATTERN MATCHING OF SIGNAL-STRENGTH DIFFERENTIALS

(75) Inventor: David Stevenson Spain, Jr., Portola Valley, CA (US)

(73) Assignee: Polaris Wireless, Inc., Mountain View, CA (US)

( * ) Notice: Subject to any disclaimer, the term of this patent is extended or adjusted under 35 U.S.C. 154(b) by 224 days.

This patent is subject to a terminal disclaimer.

(21) Appl. No.: 12/191,772

(22) Filed: Aug. 14, 2008

(65) Prior Publication Data

US 2008/0299995 A1 Dec. 4, 2008

Related U.S. Application Data

(63) Continuation of application No. 10/357,645, filed on Feb. 4, 2003, now Pat. No. 7,460,505.

(51) Int. Cl.
*H04W 4/00* (2009.01)
(52) U.S. Cl. .................................................. 370/328
(58) Field of Classification Search .................. None
See application file for complete search history.

(56) References Cited

U.S. PATENT DOCUMENTS

| 5,404,376 | A | | 4/1995 | Dent |
| 5,862,476 | A | * | 1/1999 | Hasegawa ................. 455/432.2 |
| 5,943,014 | A | | 8/1999 | Gilhousen |
| 6,134,448 | A | | 10/2000 | Shoji et al. |
| 6,236,849 | B1 | | 5/2001 | Reudink et al. |
| 6,496,701 | B1 | * | 12/2002 | Chen et al. ................. 455/456.5 |
| 6,782,262 | B1 | | 8/2004 | Lundborg |
| 2004/0203539 | A1 | * | 10/2004 | Benes et al. ................. 455/101 |
| 2004/0266457 | A1 | | 12/2004 | Dupray |

FOREIGN PATENT DOCUMENTS

| JP | 02044929 | 2/1990 |
| WO | 9728456 | 8/1997 |
| WO | 9815149 | 4/1998 |

OTHER PUBLICATIONS

Gaspard, Ingo et al, Position Assignment in Digital Cellular Mobile Radio Networks . . . , IEEE (O-7803-3659-3/79 (1997) pp. 592-596.
Hellebrandt, Martin et al, Estimating Position and Velocity of Mobiles in a Cellular Network, IEEE Trans. on Vehicular Technology, 46 (1) Feb. 1997, pp. 65-71.
Jimenez, J et al, Mobile Location Using Coverage Information: Theoretical Analysis and Results, Eurot-Cost 043 (Apr. 1999) pp. 1-9.
Koshima, Hiroaki et al, Personal Locator Services Emerge, IEEE Spectrum, Feb. 2000, pp. 41-48.

\* cited by examiner

*Primary Examiner* — Raj Jain
(74) *Attorney, Agent, or Firm* — Kaplan Breyer Schwarz & Ottesen, LLP

(57) ABSTRACT

A method of estimating the location of a wireless terminal is disclosed that is ideally suited for use with legacy systems. The illustrative embodiment of the present invention is based on the observation that the signal strength of a signal from a transmitter is different at some locations, and, therefore, the location of a wireless terminal can be estimated by comparing the signal strength it currently observes against a map or database that correlates locations to signal strengths. For example, if a particular radio station is known to be received well at a first location and poorly at a second location, and a given wireless terminal at an unknown location is receiving the radio station poorly, it is more likely that the wireless terminal is at the second location than it is at the first location.

16 Claims, 12 Drawing Sheets

LOCATION ESTIMATION OF WIRELESS TERMINALS THROUGH PATTERN MATCHING OF SIGNAL-STRENGTH DIFFERENTIALS

CROSS-REFERENCE TO RELATED APPLICATION

This application is a continuation of U.S. patent application Ser. No. 10/357,645, filed Feb. 4, 2003, now pending.

The underlying concepts, but not necessarily the nomenclature, of these applications are incorporated by reference:
(i) U.S. Pat. No. 6,269,246, issued 31 Jul. 2001;
(ii) U.S. patent application Ser. No. 09/532,418, filed 22 Mar. 2000;
(iii) U.S. patent application Ser. No. 10/128,128, filed 22 Apr. 2002; and
(iv) U.S. patent application Ser. No. 10/299,398, filed 18 Nov. 2002.

FIELD OF THE INVENTION

The present invention relates to telecommunications in general, and, more particularly, to a technique for estimating the location of a wireless terminal.

BACKGROUND OF THE INVENTION

Figure 1:
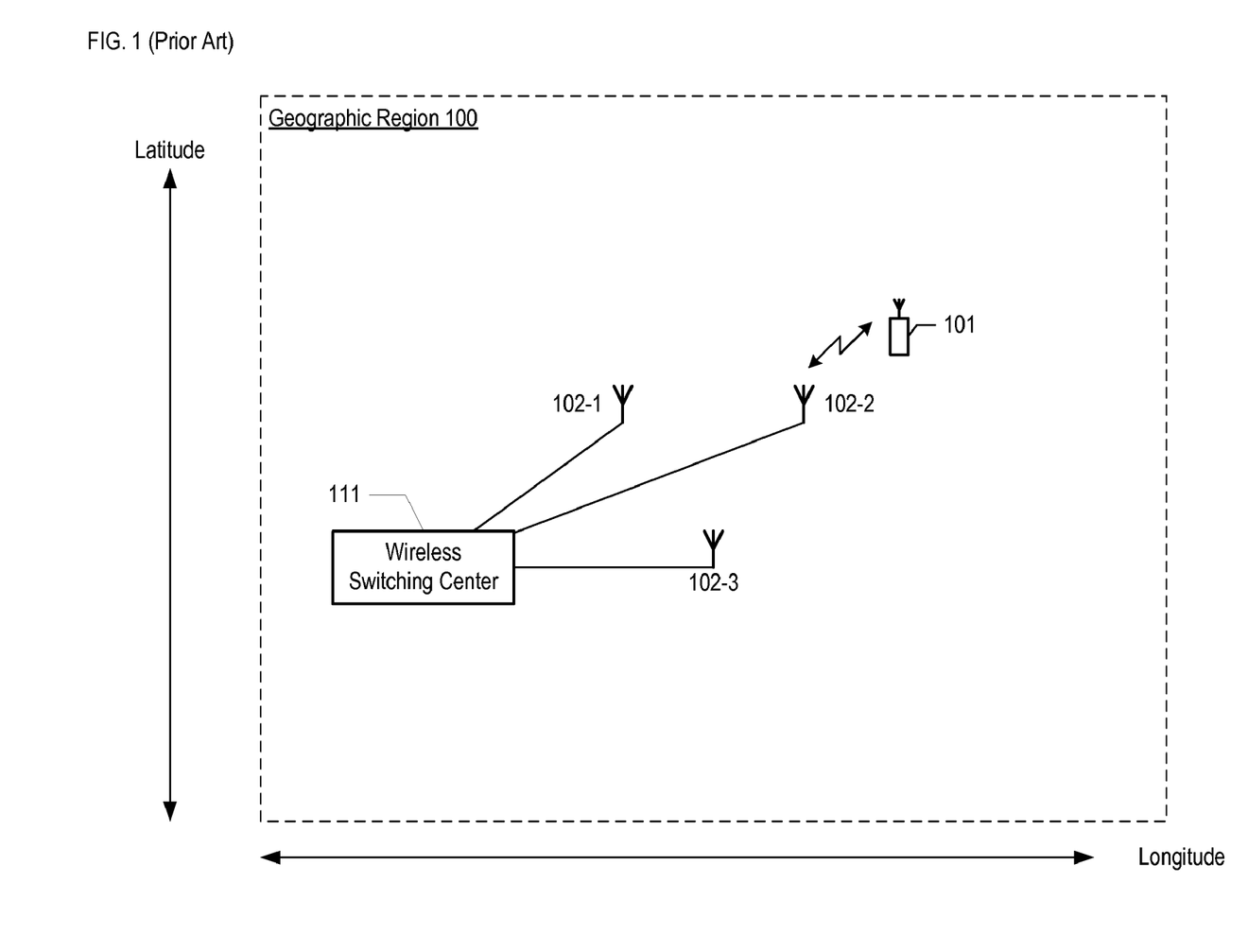
FIG. 1 depicts a map of a portion of a wireless telecommunications system in the prior art.

FIG. 1 depicts a map of a geographic region that is serviced by a wireless telecommunications system, which system provides wireless telecommunications service to wireless terminals (e.g., wireless terminal 101) within the region. The heart of the telecommunications system is wireless switching center 110, which might also be known as a mobile switching center ("MSC") or a mobile telephone switching office ("MTSO").

Typically, wireless switching center 111 is connected to a plurality of base stations (e.g., base stations 102-A through 102-C), which are dispersed throughout the geographic area serviced by the system. As is well known to those skilled in the art, wireless switching center 111 is responsible for, among other things, establishing and maintaining calls between wireless terminals and between a wireless terminal and a wireline terminal (which is connected to the system via the local and/or long-distance networks and which are not shown in FIG. 1).

The salient advantage of wireless telecommunications over wireline telecommunications is the mobility that is afforded to the users of the wireless telecommunications system. On the other hand, the salient disadvantage of wireless telecommunications lies in that fact that because the user is mobile, an interested party might not be able to readily ascertain the location of the user.

Such interested parties might include both the user of the wireless terminal and remote parties. There are a variety of reasons why the user of a wireless terminal might be interested in knowing his or her own location. For example, the user might be interested in telling a remote party where he or she is.

There are a variety of reasons why a remote party might be interested in knowing the location of the user. For example, the recipient of a 911 emergency call from a wireless terminal might be interested in knowing the location of the wireless terminal so that emergency services vehicles can be dispatched to that location.

There are many techniques in the prior art for estimating the location of a wireless terminal.

In accordance with one technique, the location of a wireless terminal is estimated to be at the center of the cell in which the wireless terminal is located. This technique is advantageous in that it does not require that additional hardware be added to the wireless terminal or to the wireless telecommunications system, and this means that the first technique can be inexpensively implemented in legacy systems. The first technique is only accurate, however, to a few kilometers, and, therefore, it is generally not acceptable for applications (e.g., emergency services dispatch, etc.) that require higher accuracy.

In accordance with a second technique, the location of a wireless terminal is estimated by triangulating the angle of arrival or the time of arrival of the signals transmitted by the wireless terminal to be located at various receivers. This technique is accurate to within a few hundreds of meters and is advantageous in that it can be used with legacy wireless terminals. It is disadvantageous, however, in that it generally requires that hardware be added to the telecommunication system's base stations, and this is very expensive.

In accordance with a third technique, the location of a wireless terminal is estimated by a radio navigation unit, such as a Global Positioning System receiver, that is incorporated into the wireless terminal. This technique is accurate to within tens of meters and is advantageous in that it does not require that additional hardware be added to the telecommunication system's infrastructure. The third technique is disadvantageous, however, in that it cannot be used with legacy wireless terminals that do not comprise a radio navigation unit.

Therefore, the need exists for a technique for estimating the location of a wireless terminal with higher resolution than the first technique and that can be inexpensively implemented in legacy systems.

SUMMARY OF THE INVENTION

The present invention enables the estimation of the location of a wireless terminal without the addition of hardware to either the wireless terminal or to the telecommunication system's base stations. Some embodiments of the present invention are, therefore, ideally suited for use with legacy systems.

The illustrative embodiment of the present invention is based on the observation that the signal strength of a signal from a transmitter is different at some locations, and, therefore, the location of a wireless terminal can be estimated by comparing the signal strength it currently observes against a map or database that correlates locations to signal strengths. For example, if a particular radio station is known to be received well at a first location and poorly at a second location, and a given wireless terminal at an unknown location is receiving the radio station poorly, it is more likely that the wireless terminal is at the second location than it is at the first location.

When this same principal is applied to multiple transmitters and multiple signals, the location of a wireless terminal can be discriminated among locations where the signal strength of one signal is the same. A simple example illustrates this point. A first radio station, Radio Station A, can be received well at Location 1 and Location 2, but poorly at Location 3 and Location 4, and a second radio station, Radio Station B, can be received well at Location 1 and Location 3, but poorly at Location 2 and Location 4. This information is summarized in the table below and forms the basis for a map or database that correlates location to signal strength.

TABLE 1

Illustrative Signal Strength Database (Absolute Reception)

|  | Radio Station A | Radio Station B |
| --- | --- | --- |
| Location 1 | Good Reception | Good Reception |
| Location 2 | Good Reception | Poor Reception |
| Location 3 | Poor Reception | Good Reception |
| Location 4 | Poor Reception | Poor Reception |

If a given wireless terminal at an unknown location can receive Radio Station A poorly and Radio Station B well, it is more likely that the wireless terminal is at Location 3 than it is at either Location 1, 2, or 4.

Furthermore, the location of a wireless terminal can be estimated with a more-than-acceptable degree of accuracy when the signal strength of each signal at each location is quantified. For example, if a particular radio station is known to be received in one location with a strength of −50 dBm, at a second location with a strength of −53 dBm, and at a third location with a strength of −55 dBm, then the reception of the signal with a strength of −56 dBm suggests that the wireless terminal is more likely at the third location than at either the first or second location.

These principals largely assume, however, that the equipment used to measure the signal strength of the signals is uniformly calibrated, and this, unfortunately, is not always the case is the real world. Many factors, including the make and model of a wireless terminal, the condition of its antenna, the state of its battery, and whether the terminal is inside a vehicle or not can introduce measurement biases that can cause errors in estimating the location of a wireless terminal.

The illustrative embodiment ameliorates the effects of these biases by pattern matching not the observed signal strengths to the predicted signal strengths themselves, but by pattern matching the pair-wise differentials of the observed signals strengths to the pair-wise differentials of the predicted signal strengths. A simple example illustrates this nuance. A first radio station, Radio Station A, can be received at −56 dBm at Location 1, −42 dBm at Location 2, −63 dBm at Location 3, and −61 dBm at Location 4, and a second radio station, Radio Station B, can be received at −63 dBm at Location 1, −56 dBm at Location 2, −65 dBm at Location 3, and −52 dBm at Location 4. This information is summarized in the table below and forms the basis for a map or database that correlates location to signal strength.

TABLE 2

Illustrative Signal Strength Database (Differential Reception)

|  | Radio Station A | Radio Station B | Difference |
| --- | --- | --- | --- |
| Location 1 | −56 dBm | −63 dBm | −7 dBm |
| Location 2 | −42 dBm | −56 dBm | −14 dBm |
| Location 3 | −63 dBm | −65 dBm | −2 dBm |
| Location 4 | −61 dBm | −52 dBm | 9 dBm |

If a given wireless terminal with a broken antenna and at an unknown location receives Radio Station A at −47 dBm and Radio Station B at −61 dBm, then it registers Radio Station A as 14 dBm stronger than Radio Station B. This suggests that the wireless terminal is more likely to be at Location 2 than it is at Location 1, 3, or 4.

A disadvantage of this approach is that the common bias is eliminated at the expense of (1) doubling the variance of the random measurement noise, and (b) by reducing the number of data points to match by one. Furthermore, the pair-wise subtraction introduces correlation into the relative signal strength measurement errors (i.e., all of the data points to be matched are statistically correlated). This correlation must be accounted for in calculating the likelihood of the measurement report.

The illustrative embodiment comprises: receiving a first signal-strength measurement for a first signal at the wireless terminal and a second signal-strength measurement for a second signal at the wireless terminal; and estimating the location of the wireless terminal based on the difference of the first signal-strength measurement minus the second signal-strength measurement.

DETAILED DESCRIPTION

Figure 2:
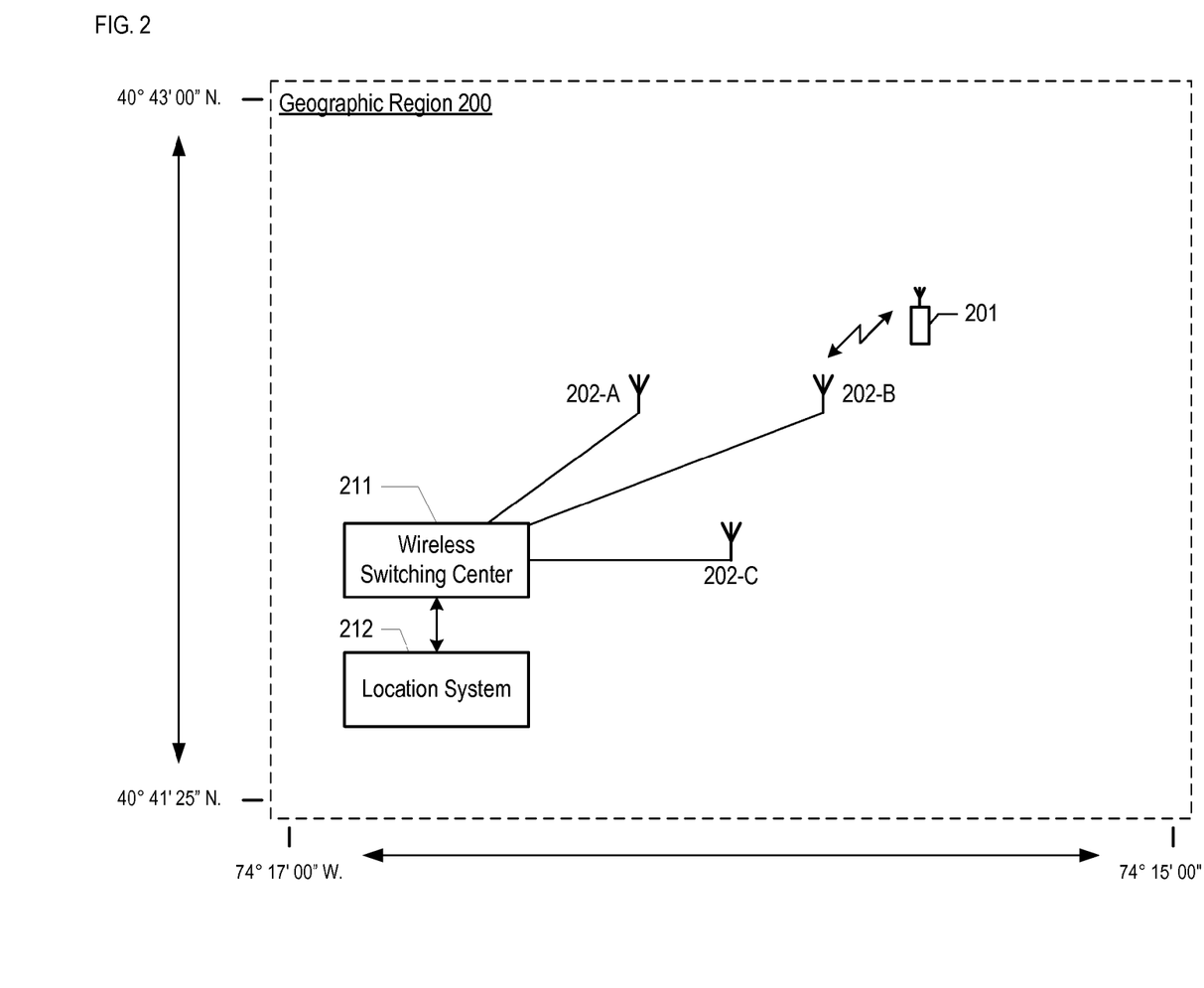
FIG. 2 depicts a map of the illustrative embodiment of the present invention.

FIG. 2 depicts a map of the illustrative embodiment of the present invention, which comprises: wireless switching center 211, location system 212, base stations 202-1, 202-2, and 202-3, and wireless terminal 201, which are interconnected as shown. The illustrative embodiment provides wireless telecommunications service to most of geographic region 200, in well-known fashion, and is also capable of estimating the location of wireless terminal 201 within geographic region 200.

The illustrative embodiment operates in accordance with the Global System for Mobile Communications (formerly known as the Groupe Speciale Mobile), which is ubiquitously known as "GSM." After reading this disclosure, however, it will be clear to those skilled in the art how to make and use embodiments of the present invention that operate in accordance with other protocols, such as the Universal Mobile Telephone System ("UMTS"), CDMA-2000, and IS-136 TDMA.

Wireless switching center 211 is a switching center as is well-known to those skilled in the art in most respects but is different in that it is capable of communicating with location system 212 in the manner described below. After reading this disclosure, it will be clear to those skilled in the art how to make and use wireless switching center 211.

Base stations 202-1, 202-2, and 202-3 are well-known to those skilled in the art and communicate with wireless switching center 211 through cables and other equipment (e.g., base station controllers, etc.) that are not shown in FIG. 2. Although the illustrative embodiment comprises three base stations, it will be clear to those skilled in the art how to make and use embodiments of the present invention that comprise any number of base stations.

Wireless terminal 201 is a standard GSM wireless terminal, as is currently manufactured and used throughout the world. Wireless terminal 201 is equipped, in well-known fashion, with the hardware and software necessary to measure and report to wireless switching center 211 on the signal-strength of the control and traffic channels from base stations 202-1, 202-2, and 202-3.

A GSM wireless terminal, such as wireless terminal 201, is capable of reporting the signal strength of a signal as one of 64 levels between −47 dBm and −110 dBm. Any signal stronger than −47 dBm is reported as −47 dBm, and any signal weaker than −110 dBm is reported as −110 dBm.

In accordance with the illustrative embodiment of the present invention all of the specific portions of the radio frequency spectrum fall within the same band that wireless terminal 201 uses to communicate with base stations 202-1, 202-2, and 202-3. In some alternative embodiments of the present invention, however, some or all of the specific portions of the radio frequency spectrum are outside the band that wireless terminal 201 uses to communicate with base stations 202-1, 202-2, and 202-3. In any case, it will be clear to those skilled in the art how to make and use wireless terminal 201.

Location system 212 is a computer system that is capable of estimating the location of wireless terminal 201, as described in detail below. Although the illustrative embodiment depicts location system 212 as estimating the location of only one wireless terminal, it will be clear to those skilled in the art that location system 212 is capable of estimating the location of any number of wireless terminals serviced by wireless switching center 211.

Although location system 212 is depicted in FIG. 2 as a distinct entity from wireless switching center 211, this is done principally to highlight the distinction between the functions performed by wireless switching center 211 and the functions performed by location system 212. In other words, it will be clear to those skilled in the art how to make and use embodiments of the present invention in which location system 212 resides within or without wireless switching center 211.

Although—again for pedagogical purposes—wireless switching center 211, location system 212, and base stations 202-1, 202-2, and 202-3 are depicted in FIG. 2 as being within geographic region 200, this is not necessarily so, and it will be clear to those skilled in the art how to make and use embodiments of the present invention in which some or all of these pieces of equipment are not within the region of location estimation.

Figure 3:
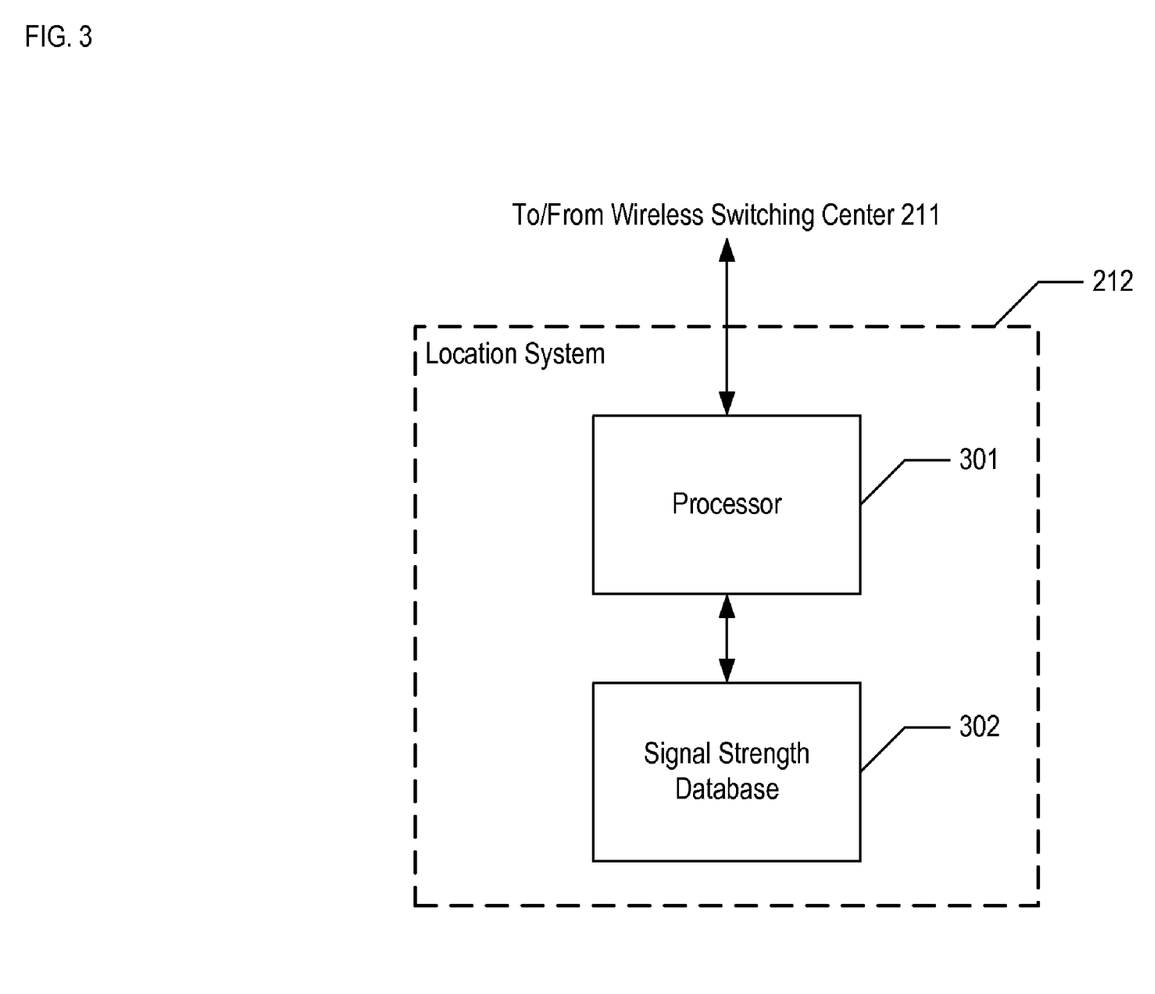
FIG. 3 depicts a block diagram of the salient components of location system 212.

FIG. 3 depicts a block diagram of the salient components of location system 212, which comprises: processor 301 and signal-strength database 302, which are interconnected as shown.

Processor 301 is a general-purpose processor as is well-known in the art that is capable of performing the operations described below and with respect to FIG. 4.

Signal-strength database 302 is a non-volatile memory that stores signal-strength measurements as described below and with respect to FIG. 4.

Figure 4:
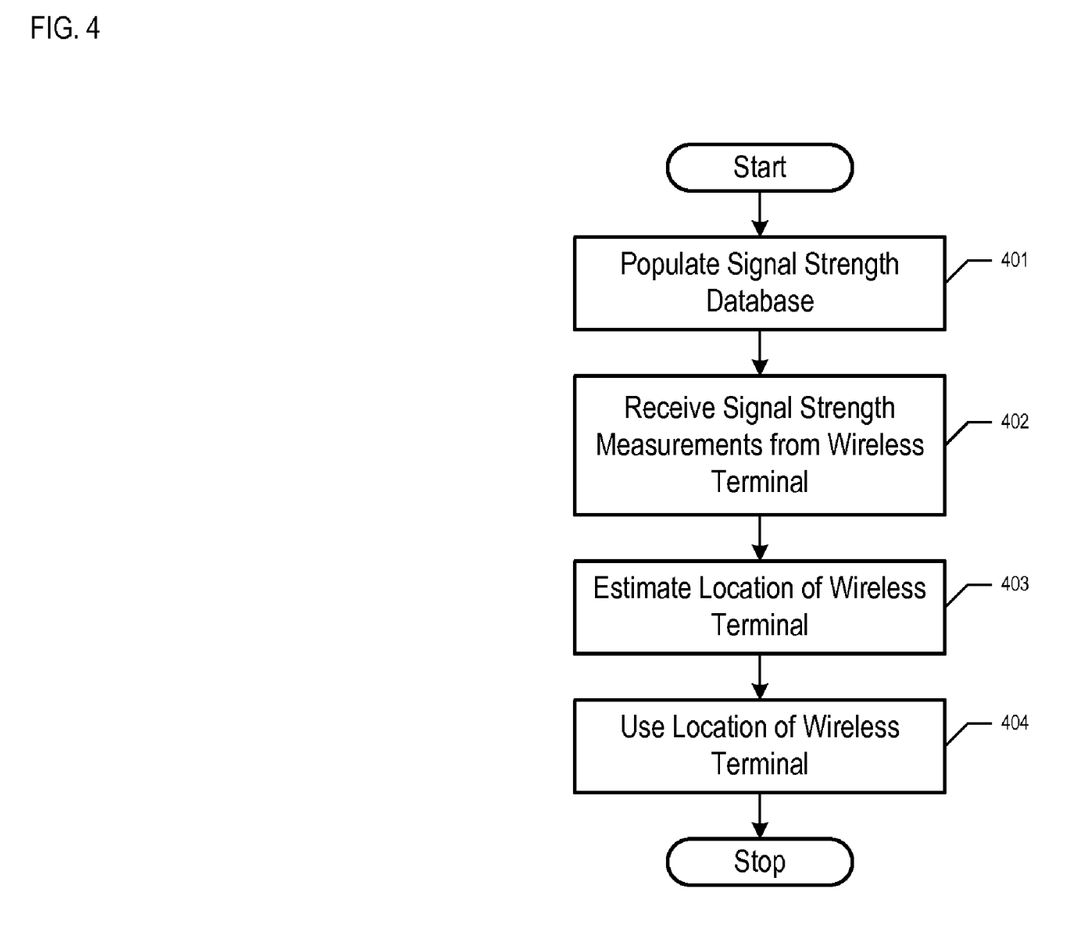
FIG. 4 depicts a broad overview of the salient operations performed by the illustrative embodiment in ascertaining the location of wireless terminal 201 in geographic region 200.

Overview—FIG. 4 depicts a broad overview of the salient operations performed by the illustrative embodiment in ascertaining the location of wireless terminal 201 in geographic region 200. In summary, the tasks performed by the illustrative embodiment can be grouped for ease of understanding into four operations:

i. the population of signal-strength database 302,
ii. the receipt of signal-strength measurements from wireless terminal 201,
iii. the estimation of the location of wireless terminal 201, and
iv. the use of the estimated location of wireless terminal 201.

Figure 12:
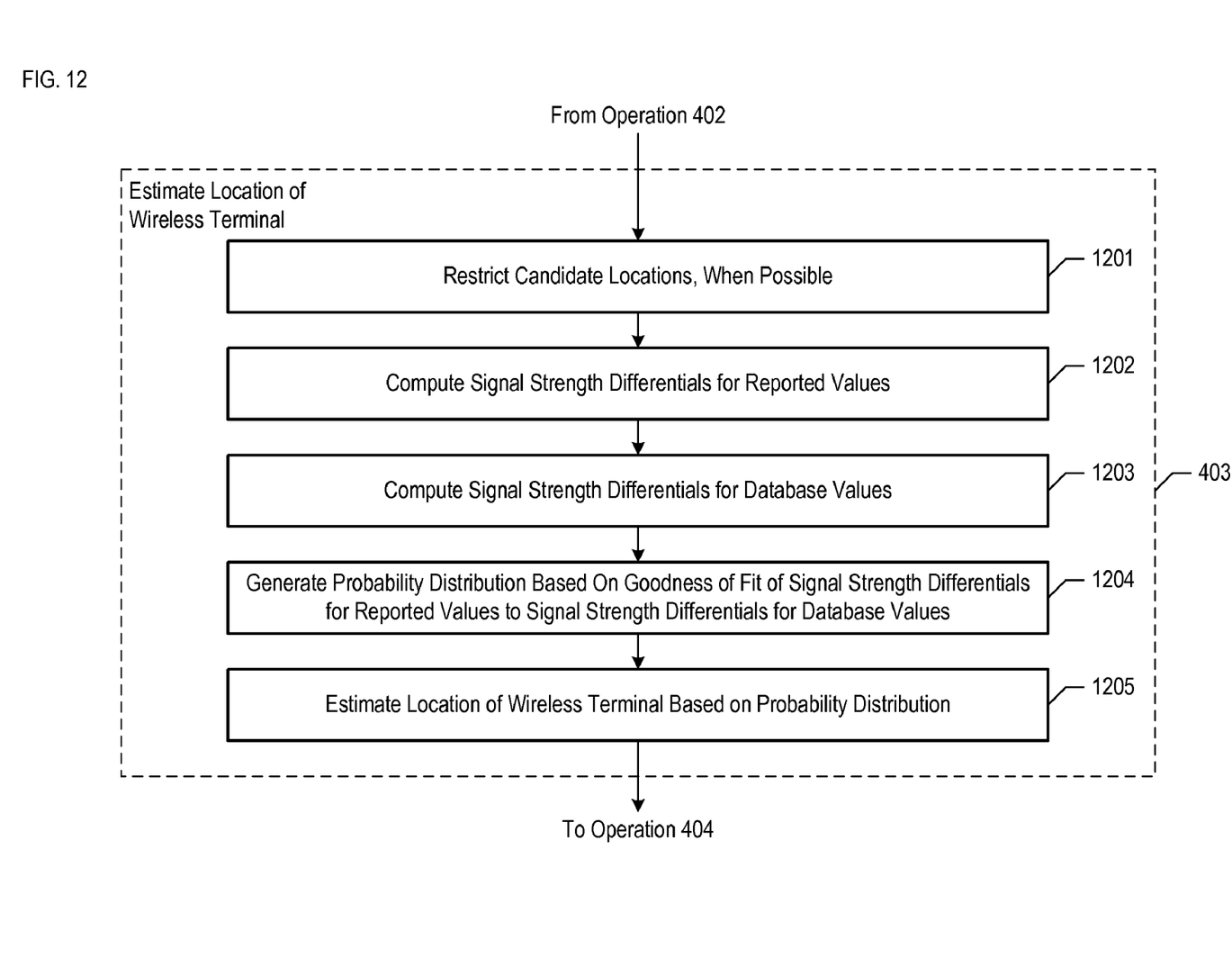
FIG. 12 depicts a flowchart of the salient operations performed in operation 403.

The details of each of these operations are described briefly below and in detail afterwards with respect to FIGS. 5 though 12.

At operation 401, signal-strength database 302 is populated with data that associates each location within geographic region 200 with a tuple of signal-strength measurements for that location. Operation 401 is generally complex and potentially expensive, and it is, therefore, preferably performed only occasionally. The details of operation 401 are described in detail below and with respect to FIG. 5.

At operation 402, location system 212 receives a tuple of signal-strength measurements from wireless terminal 201. In accordance with the illustrative embodiment, wireless terminal 201 periodically or sporadically provides a tuple of signal-strength measurements to wireless switching center 211 in well-known fashion, and the measurements are forwarded to location system 212. The details of operation 402 are described in detail below and with respect to FIG. 11.

At operation 403, location system 212 estimates the location of wireless terminal 201 based on:
(i) the tuple of signal-strength measurements received in operation 402, and
(ii) the tuples of signal-strength measurements within signal-strength database 302.

The details of operation 403 are described in detail below and with respect to FIG. 12.

At operation 404, location system 212 transmits the location estimated in operation 403 to an entity (not shown) for use in an application. It is well known to those skilled in the art how to use the estimated location of a wireless terminal in an application.

At this point, each of these four operations is described in detail.

Figure 5:
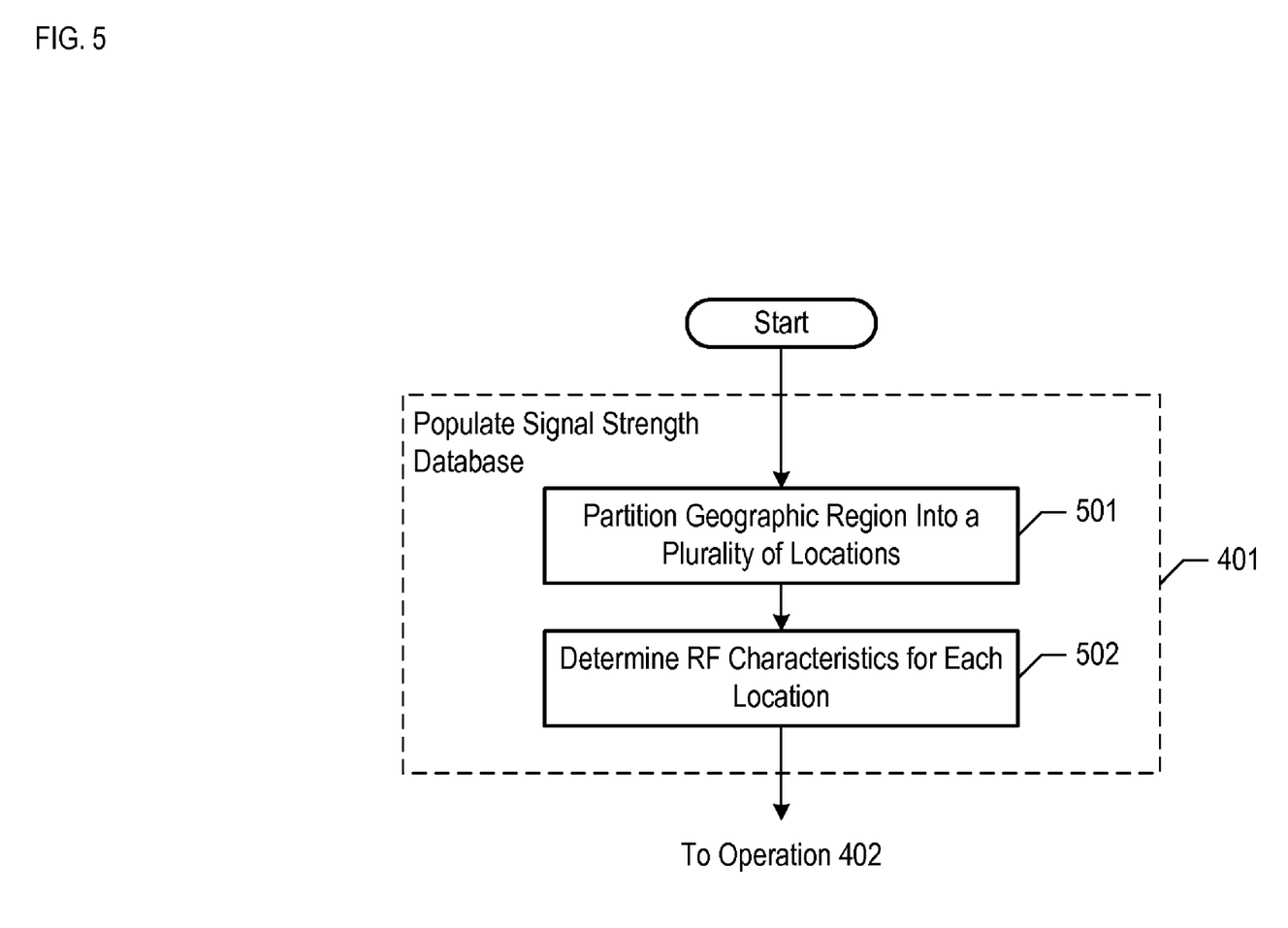
FIG. 5 depicts a flowchart of the salient operations performed in operation 401.

Population of Signal-Strength Database 302—FIG. 5 depicts a flowchart of the salient operations performed in operation 401.

At task 501, geographic region 200 is partitioned into a plurality of tessellated locations. Geographic region 200 is rectangular and comprises 5,525 square arc-seconds, which near the equator equals almost 5 square kilometers. After reading this specification, it will be clear to those skilled in the art how to make and use embodiments of the present invention that operate with geographic regions of any size and shape.

Figure 6:
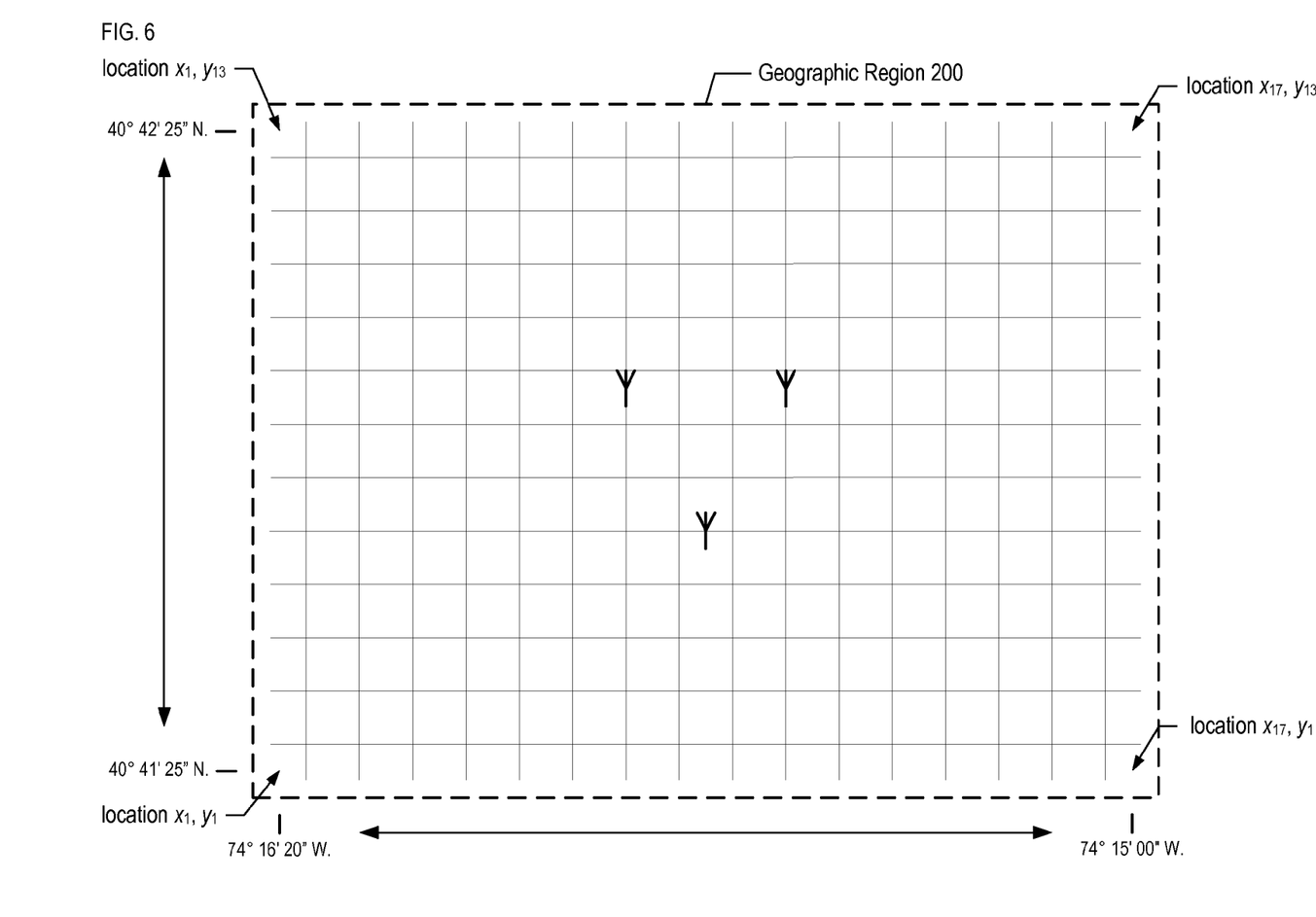
FIG. 6 depicts a map of how geographic region 200 is partitioned into 221 locations in accordance with the illustrative embodiment of the present invention.

In accordance with the illustrative embodiment of the present invention, geographic region 200 is partitioned into a grid of 221 square locations that are designated location $x_1, y_1$ through location $x_{17}, y_{13}$, as shown in FIG. 6. The number of locations into which geographic location 200 is partitioned is arbitrary, subject to the considerations described below. In accordance with the illustrative embodiment, each location is an area of approximately 5 arc-seconds in length by 5 arc-seconds in height. Five arc-seconds near the equator equals approximately 150 meters.

The size of the locations defines the highest resolution with which the illustrative embodiment can locate a wireless terminal. In other words, the illustrative embodiment can only estimate the location of a wireless terminal to within one location (i.e., 5 by 5 arc-seconds in the illustrative embodiment). If greater resolution is desired, for example 1 arc-second resolution, then geographic region 200 would need to be partitioned into 1 arc-second by 1 arc-second locations. If geographic region 200 were partitioned into 1 arc-second by 1 arc-second locations, there would be 5,525 squares, which is considerably more than the 221 used in the illustrative embodiment. Although the ostensibly higher resolution of 1 arc-second versus 5 arc-seconds is advantageous, there are considerable disadvantages to a large number of locations.

The number of locations to partition geographic region 200 into is based on three factors. First, as the size of each location goes down, the resolution of the embodiment increases. Second, as the size of each location goes down, the number of locations in a region increases, and, consequently, the computational complexity of operation 403 increases quickly. Third, each location must be large enough so that it has (at least slightly) different signal-strength characteristics than its adjacent areas. This is because the illustrative embodiment might—but won't necessarily—have difficulty distinguishing between adjacent location that have the same signal-strength characteristics. It will be clear to those skilled in the art how to consider these three factors when deciding how to partition a geographic region.

At task 502, the signal-strength measurements for a signal from each base station are determined at each location in geographic region. In accordance with the illustrative embodiment, the signal used from each base station is the control channel because it is broadcast at a constant power and because wireless terminal 201 can distinguish it from every other control channel, if it can decode its BSIC (for GSM networks).

Because there are three base stations in the illustrative embodiment, each with one control channel, a tuple of three signal-strength measurements at each location must be determined.

Figure 7A:
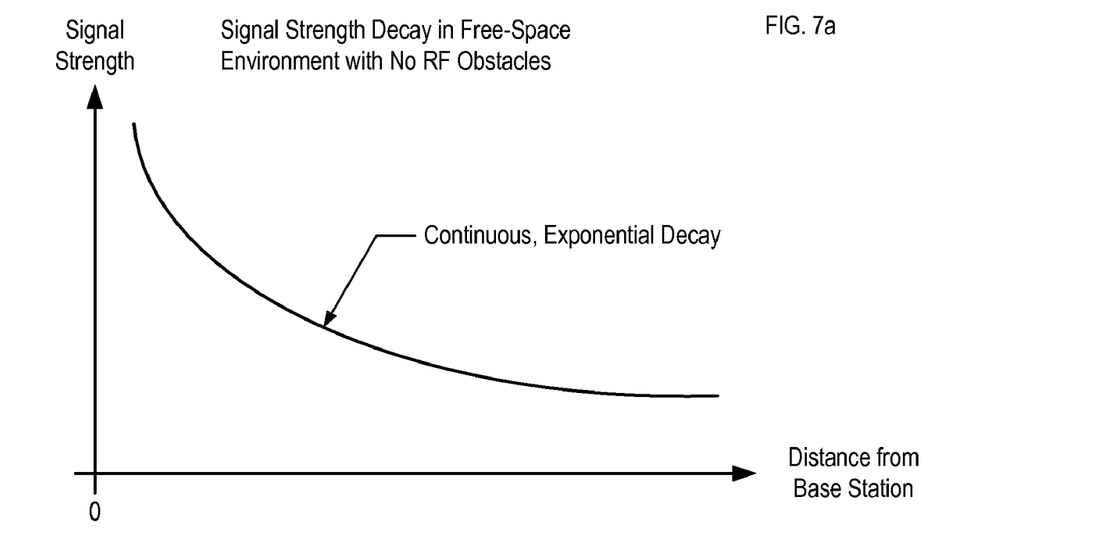
FIG. 7a depicts a graph that shows that the signal-strength of an electromagnetic signal decreases, in general, as a function of the distance from the transmitter and in an environment with no radio frequency obstacles.
Figure 7B:
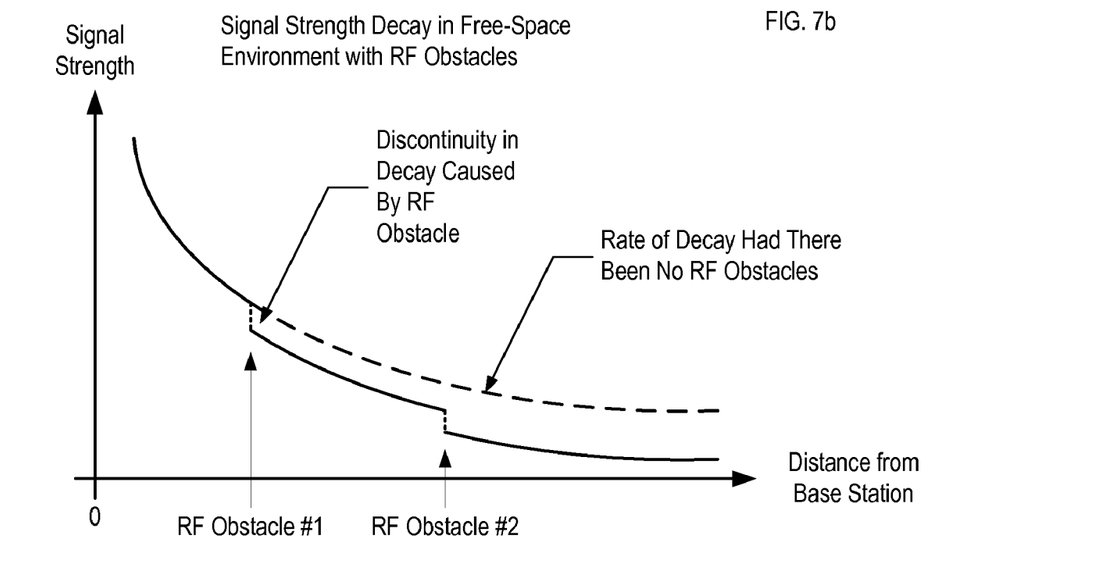
FIG. 7b depicts a graph that shows that the signal-strength of an electromagnetic signal decreases, in general, as a function of the distance from the transmitter and in an environment with two radio frequency obstacles.

In general, the signal-strength of an electromagnetic signal decreases as a function of the distance from the transmitter, as is depicted in FIG. 7a, but the topography of the region and the presence of buildings, trees, and other radio-frequency obstacles severely alters this generalization, as is depicted in FIG. 7b.

In accordance with the illustrative embodiment, the tuple of three signal-strength measurements for each location are determined through a combination of:

(i) a theoretical radio-frequency propagation model, and (ii) empirical signal-strength measurements.

It will be clear to those skilled in the art how to accomplish this.

For example, one well-known modeling for outdoor radio-frequency signal propagation is adapted from the power-law decay model. The power-law decay model assumes that the base station's antenna is high above the ground and that there is line-of-sight propagation to the wireless terminal. In this case, the mean signal-strength, P, received at the wireless terminal decays in inverse proportion to the square of the distance from the transmitter, $$P \propto \frac{1}{r^2}, \quad \text{(Eq. 1)}$$

up to some break-point. Beyond that breakpoint, the mean power at the wireless terminal decays in inverse proportion to the fourth power of the distance from the transmitter:

$$P \propto \frac{1}{r^4} \quad \text{(Eq. 2)}$$

The location of the break-point is determined through empirical signal-strength measurements as the location at which the ground bounce signal interferes with the line-of-sight signal.

In accordance with another well-known model, the signal-strength measurements at each location are determined by taking empirical measurements at various locations and by interpolating for the locations in between the sampled locations. This method is advantageous in that it does not require many empirical measurements to be made, but it is less accurate than taking measurements at every location.

It will be clear to those skilled in the art how to determine the signal-strength measurements for each location in the geographic region whether through:

(i) theoretical radio-frequency propagation models, or (ii) empirical signal-strength measurements, or (iii) any combination of i and ii.

Figure 8:
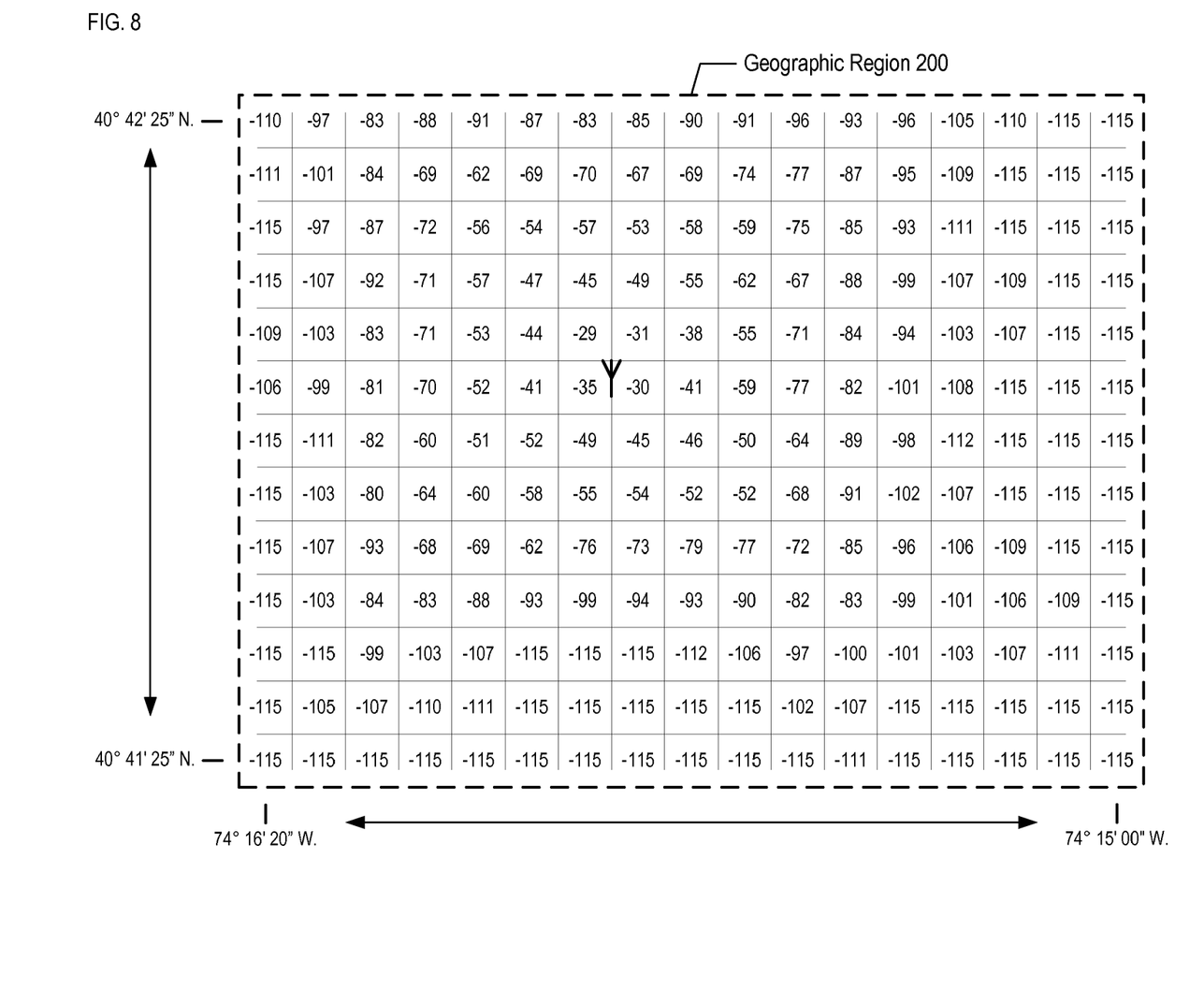
FIG. 8 depicts a map of the signal-strength measurements of the signal radiated from base station 202-1 at each location in geographic region 200.

In accordance with the illustrative embodiment, FIG. 8 depicts the signal-strength of the signal from base station 202-1 (hereinafter referred to as "Signal 1") at each location in geographic region 200. In general, Signal 1 is stronger near base station 202-1 and weaker far away from base station 202-1.

Figure 9:
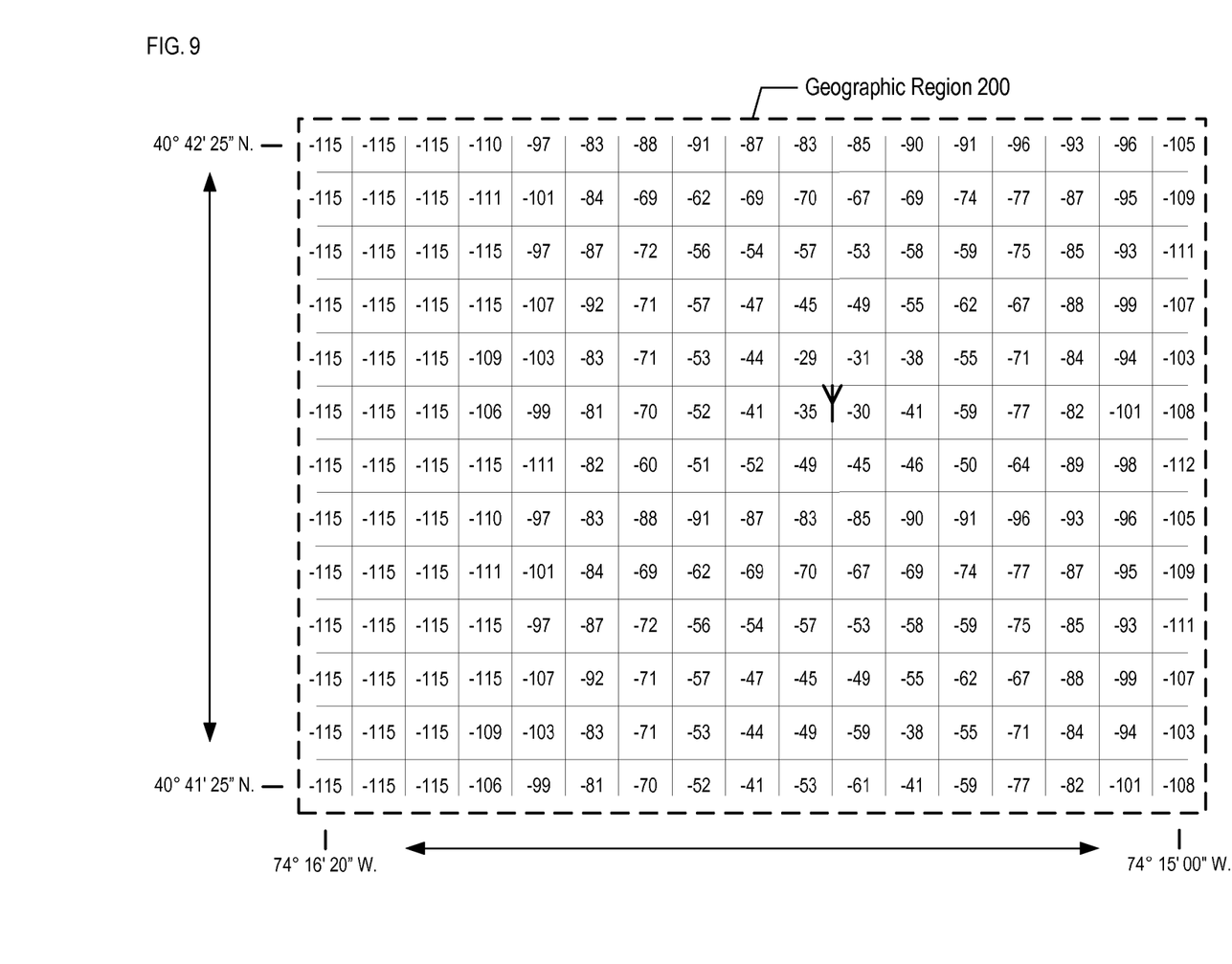
FIG. 9 depicts a map of the signal-strength measurements of the signal radiated from base station 202-2 at each location in geographic region 200.

In accordance with the illustrative embodiment, FIG. 9 depicts the signal-strength of the signal from base station 202-2 (hereinafter referred to as "Signal 2") at each location in geographic region 200. Like Signal 1, Signal 2 is stronger near base station 202-2 and weaker far away from base station 202-2.

Figure 10:
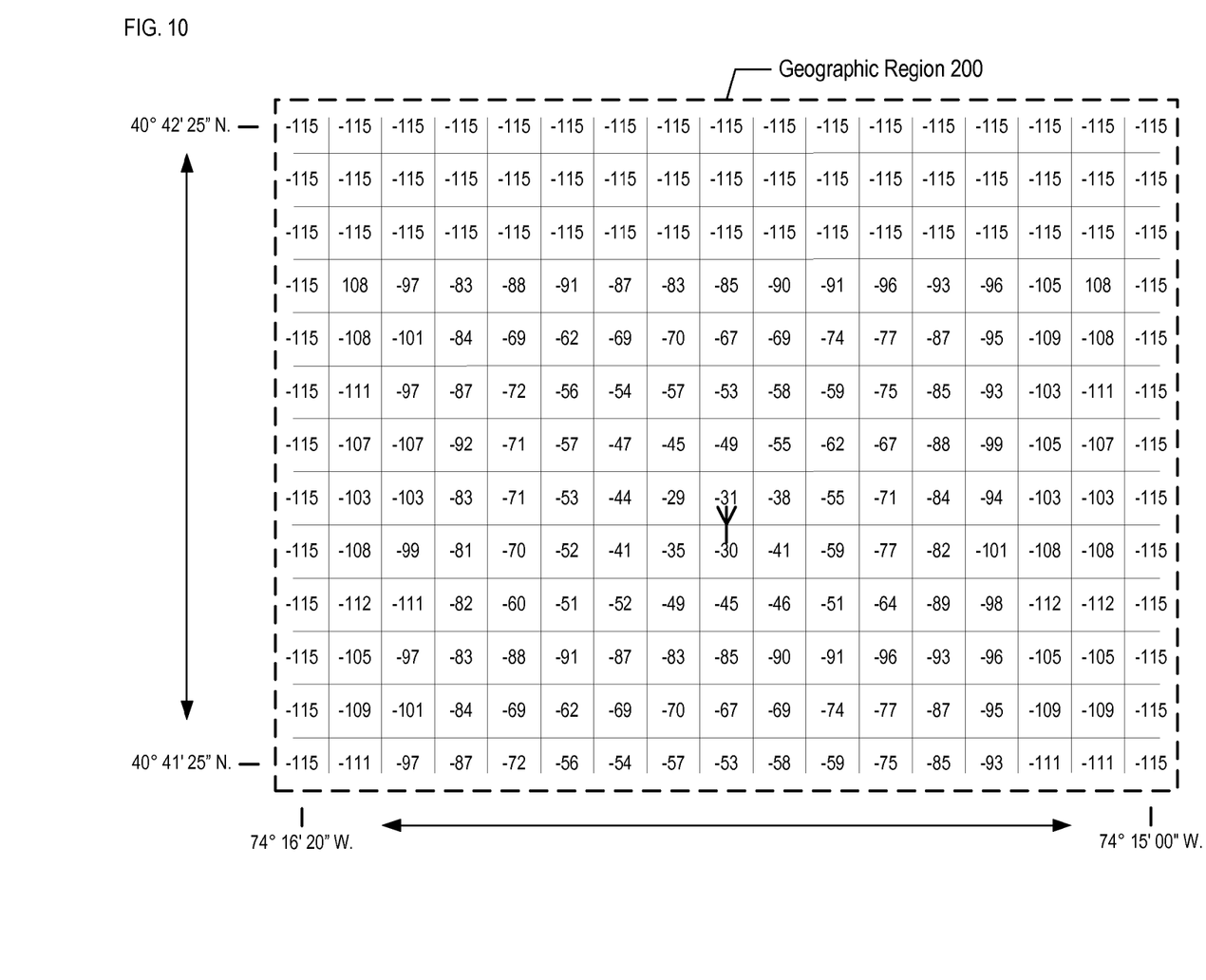
FIG. 10 depicts a map of the signal-strength measurements of the signal radiated from base station 202-3 at each location in geographic region 200.

In accordance with the illustrative embodiment, FIG. 10 depicts the signal-strength of the signal from base station 202-3 (hereinafter referred to as "Signal 3") at each location in geographic region 200. Like Signals 1 and 2, Signal 3 is stronger near base station 202-3 and weaker far away from base station 202-3.

When the signal-strength tuples for each location in geographic region 200 have been determined, they are stored in signal-strength database in a data structure that associates each location with the tuple for that location. The data structure is then stored in signal-strength database 302.

TABLE 3

Signal-Strength Database

| Location | Signal-Strength Tuple | | |
|---|---|---|---|
| | Strength of Signal 1 | Strength of Signal 2 | Strength of Signal 3 |
| $x_1, y_1$ | −115 | −115 | −115 |
| $x_2, y_1$ | −115 | −115 | −111 |
| ... | ... | ... | ... |
| $x_7, y_7$ | −45 | −51 | −49 |
| $x_8, y_7$ | −46 | −52 | −55 |
| $x_9, y_7$ | −50 | −49 | −62 |
| ... | ... | ... | ... |
| $x_{16}, y_{13}$ | −115 | −96 | −115 |
| $x_{17}, y_{13}$ | −115 | −105 | −115 |

Table 3 depicts a portion of an illustrative data structure for associating each location with the signal-strength tuple for that location.

The three signal-strength measurements in a row of table 1 constitute a "tuple" or non-empty set of ordered elements. For example, the signal-strength tuple at Location $x_7$, $y_7$ are the 3-tuple {−45, −51, −49}. In general, the illustrative embodiment of the present invention estimates the location of a wireless terminal by pattern matching the signal-strength measurements by the wireless terminal at a location against the signal-strength tuples in signal-strength database 302. This process is described in detail below and with respect to operation 402.

From task 502, control passes to operation 402 in FIG. 4.

Figure 11:
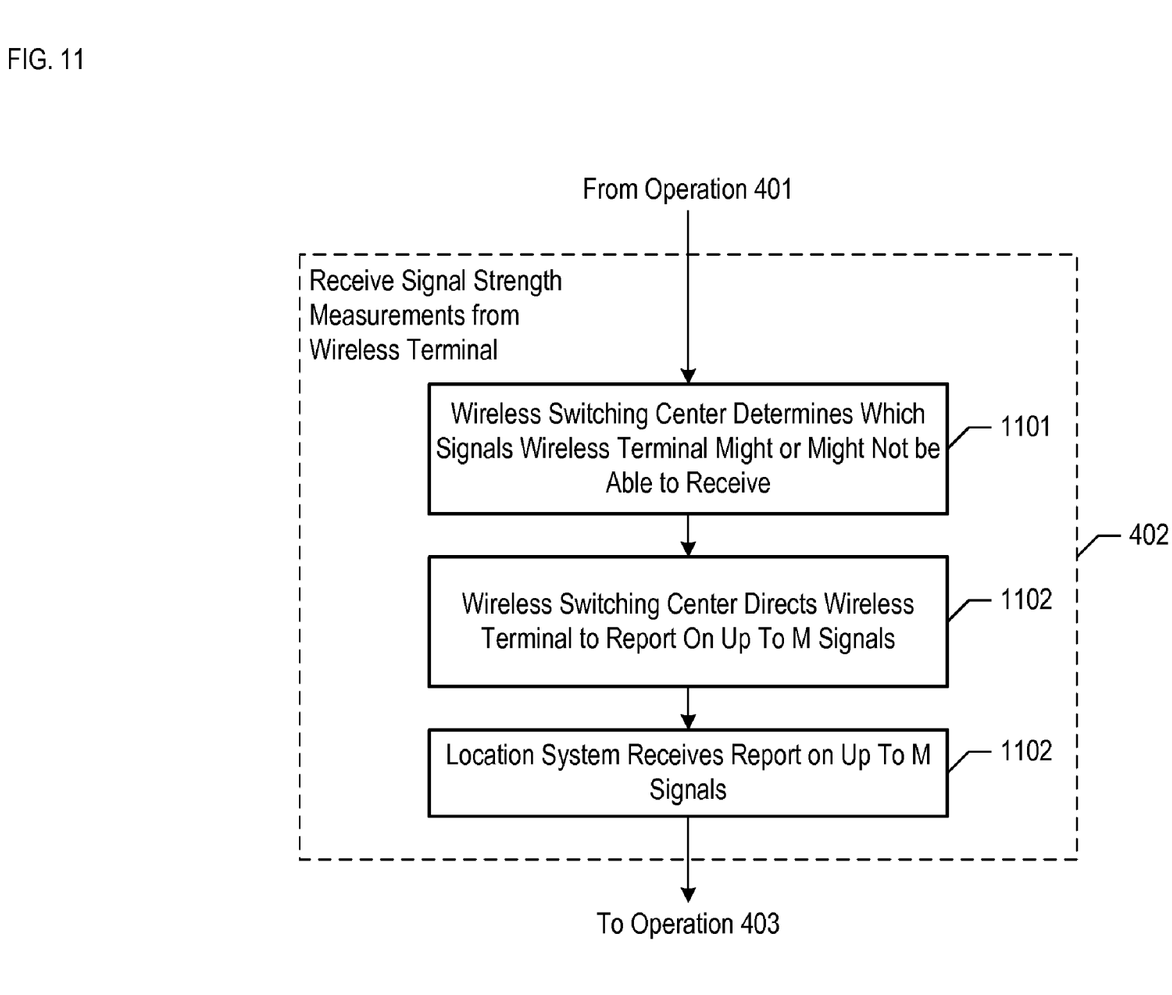
FIG. 11 depicts a flowchart of the salient operations performed in operation 402

Receipt of Signal-Strength Measurements from Wireless Terminal 201—FIG. 11 depicts a flowchart of the salient operations performed in operation 402.

At task 1101, wireless switching center 211 determines, in well-known fashion, which signals wireless terminal 201 might or might not be able to receive. In accordance with the illustrative embodiment, wireless switching center 211 determines that wireless terminal 201 might be able to receive Signal 1, Signal 2, and Signal 3.

At task 1102, wireless switching center 211 directs wireless terminal 201, in well-known fashion, to attempt to receive the signals it might be able to receive and to report back a signal-strength value for the strongest (up to) 3 signals that wireless terminal 201 is able to receive and distinguish. In accordance with the illustrative embodiment, wireless switching center 211 directs wireless terminal 211 to monitor Signal 1, Signal 2, and Signal 3 and to report on all of these signals.

At task 1103, location system 212 receives, via wireless switching center 211, a report from wireless terminal 201 on the signals that it was directed to monitor in task 602.

As described above, wireless terminal 201 is incapable of reporting a signal whose signal-strength is equal to −46 dBm or higher, and, therefore, when wireless terminal 201 attempts to report a signal whose signal-strength is −46 dBm or higher, wireless terminal 201 simply reports a signal-strength value of −47 dBm for that signal. The significance of this insight is that a reported signal-strength value of −47 dBm might not accurately reflect the magnitude of that signal's strength at that location. To further illustrate the significance of this insight and its effect on the design of the illustrative embodiment, this specification shall describe in detail how two different signal-strength reports are processed by the illustrative embodiment. In accordance with the first report, the signal-strength of all three signals is low enough so that wireless terminal 201 can report the actual strength of the signals. In accordance with the first report, Signal 1=−98, Signal 2=−64, and Signal 3=−51. In accordance with the second report, Signal 1=−98, Signal 2=−64, and Signal 3=−50. How these two types of reports are handled is described below and with respect to FIG. 12.

It will be clear to those skilled in the art how to make and use embodiments of the present invention that perform operation 402. From task 603, control passes to operation 403 in FIG. 4.

Estimation of the Location of Wireless Terminal 201—FIG. 12 depicts a flowchart of the salient operations performed in operation 403. For pedagogical purposes, operation 403 as depicted in FIG. 12 is described three times. First, operation 403 is described in the abstract with a focus on describing its underlying theory. Next, operation 403 is described as it is applied to the first report, and finally, operation 403 is described as it is applied to the second report.

Estimation in General—Task 1201 begins with 211 (17× 13=211) candidate locations that must be considered as the location for wireless terminal 201, and, therefore, 211 signal-strength tuples (i.e., the 211 tuples in signal-strength database 302) that must be processed. Tasks 1202 through 1205 can be computationally intense, and the computational burden increases with the number of candidate locations that must be considered. Therefore, location system 212 attempts, at task 1201, to reduce the number of candidate locations that must be processed in tasks 1202 through 1205.

To reduce the number of candidate locations that must be processed in tasks 1202 through 1205, location system 212 uses the following observation. When a signal is reported with a maximum signal-strength (i.e., "−47" in the illustrative embodiment), location system 212 can reasonably eliminate from consideration as a candidate location every location where the signal-strength measurement for that signal is below the maximum (minus a factor for measurement errors and systematic bias). In other words, when a signal is reported with a maximum signal-strength, location system 212 can restrict consideration in tasks 1202 through 1205 to those candidate locations where signal-strength database 302 predicts the signal-strength to be greater than or equal to the maximum reportable value (minus a factor for measurement errors and systematic bias). In accordance with the illustrative embodiment, the factor for measurement errors and systematic bias is 3 dBm, and, therefore when a signal is reported with −47, location system 212 can restrict consideration in tasks 1202 through 1205 to those candidate locations where signal-strength database 302 predicts the signal-strength to be greater than or equal to −50 dBm. It will be clear to those skilled in the art how to determine and use other factors for measurement errors and systemic bias.

At task 1202, location system 212 computes the signal-strength differentials for those reported values that are not at the maximum signal-strength. In particular, for n reported signals that are not at the maximum signal-strength, n−1 signal-strength differentials are computed where:

$$\Delta S_k = S_k - S_1 \quad \text{(Eq. 1)}$$

for k=2, 3, . . . n, wherein $\Delta S_k$ is the kth signal-strength differential, $S_k$ is the reported signal-strength of Signal k, and $S_1$ is the reported signal-strength of Signal 1. When m of the reported signals is at the maximum signal-strength (i.e., −47 dBm), then $$n-m-1 \quad \text{(Eq. 2)}$$

pair-wise differentials for the remaining n−m signals are computed, in well-known fashion. At the end of task 1202, location system 212 will have computed n−m−1 pair-wise differentials, $\Delta S_2$ through $\Delta S_{n-m}$.

At task 1203, location system 212 computes the signal-strength differentials for only those locations that were not eliminated from consideration in task 1201. Furthermore, location system 212 only computes the signal-strength differentials corresponding to the differentials computed in task 1202; the idea, of course, being to ensure that "apples are compared with apples." In particular, for n reported signals that are not at the maximum signal-strength, n−1 signal-strength differentials are computed where:

$$\Delta R_{k,x,y} = R_{k,x,y} - R_{1,x,y} \quad (Eq. 3)$$

for k=2, 3, . . . n, wherein $\Delta R_{k,x,y}$ is the kth signal-strength differential for location x,y, $R_{k,x,y}$ is the signal-strength of Signal k at location x,y in signal-strength database 302, and $R_{k,x,y}$ is the reported signal-strength of Signal 1 at location x,y in signal-strength database 302.

At the end of task 1203, location system 212 will have computed n−m−1 pair-wise differentials, $\Delta R_{2,x,y}$ through $\Delta R_{n-m,x,y}$, corresponding to the pair-wise differentials computed in task 1203, for all the candidate locations.

At task 1204, location system 212 compares the signal-strength differentials computed in task 1202, $\Delta S_2$ through $\Delta S_{n-m}$, to the signal-strength differentials in task 1203, $\Delta R_{2,x,y}$ through $\Delta R_{n-m,x,y}$, to generate a probability distribution that indicates the goodness of fit between the signal-strength differentials computed from the values received in operation 402 to the signal-strength differentials computed from the tuples in signal-strength database 302. To accomplish this, the Euclidean norm at each of the i candidate locations is computed for the signal-strength differentials computed from the values received in operation 402 and each of the signal-strength differentials computed from the tuples in signal-strength database 302. This is described in Equation 4.

$$v_{x,y} = \sqrt{\Sigma_2^n (\Delta R_{k,x,y} - \Delta S_k)^2} \quad (Eq. 4)$$

wherein $v_{x,y}$ is the Euclidean norm between the signal-strength tuple for location x,y in signal-strength database 302 in comparison to the signal-strength differentials computed from the values received in operation 402.

Next, the Euclidean norms computed in Equation 4 are turned into un-normalized probabilities by Equation 5:

$$p_{x,y} = e^{\frac{-v_{x,y}^2}{\tau^2}} \quad (Eq. 5)$$

where $\tau^2$ represents the amount of uncertainty in both $\Delta S_k$ and $R_{k,x,y}$.

And finally, the values of $P_{x,y}$ are normalized to generate the probability distribution for the location of wireless terminal 201 in geographic region 200.

At task 1205, location system 212 estimates the location of wireless terminal 201 based on the probability distribution generated in task 1204. In accordance with the illustrative embodiment, location system 212 estimates the location of wireless terminal based on the geometric mean of the probability distribution generated in task 1204. After reading this specification, however, it will be clear to those skilled in the art how to make and use embodiments of the present invention that estimate the location of wireless terminal 201 based on another function of the probability distribution generated in task 1204, such as the maximum likelihood function.

From task 1205, control passes to operation 404 in FIG. 4.

Estimation As Applied to First Report (Signal 1=−98. Signal 2=−64, and Signal 3=−51)—At task 1201, location system 212 cannot eliminate any candidate locations from consideration based on the fact that none of the reported signals is at the maximum reportable value minus the factor for measurement errors and systematic bias (i.e., 3 dBm). In other words, location system 212 cannot eliminate any candidate signal from consideration because all of the signals are at −51 dBm or less. Therefore, location system 212 must consider all 221 candidate locations in tasks 1202 through 1205.

At task 1202, location system 212 computes two (2) signal-strength differentials for the first report in which $R_1$=Signal 1=−98, $R_2$=Signal 2=−64, and $R_3$=Signal 3=−43. In particular, $\Delta R_2$ and $\Delta R_3$ are computed as depicted in Table 4.

TABLE 4

| Signal-strength Differentials for Signal 1 = −98, Signal 2 = −64, and Signal 3 = −43 | | |
|---|---|---|
| k | $\Delta R_k$ | $R_k - R_1$ |
| 2 | 34 | −64 − (−98) |
| 3 | 47 | −51 − (−98) |

At task 1203, location system 212 computes two (2) signal-strength differentials for each of the 221 locations in signal-strength database 302, as depicted in Table 5.

TABLE 5

| Signal-strength Differentials for Each Tuple in Signal-Strength Database 302 | | |
|---|---|---|
| Location | $\Delta S_{2,x,y}$ | $\Delta S_{3,x,y}$ |
| x1, y1 | −110 − (−110) = 0 | −110 − (−110) = 0 |
| x2, y1 | −110 − (−110) = 0 | −111 − (−110) = −1 |
| x3, y1 | −110 − (−110) = 0 | −97 − (−110) = 3 |
| ... | ... | ... |
| x16, y13 | −96 − (−110) = 14 | −110 − (−110) = 0 |
| x17, y13 | −105 − (−110) = 5 | −110 − (−110) = 0 |

At task 1204, location system 212 first computes the Euclidean norm between the signal-strength differentials in Table 2 against the signal-strength differentials for each location in Table 3 to produce the norms shown in Table 6.

TABLE 6

| Euclidean Norms for Each Location (First Report) | |
|---|---|
| Location | Vx, y |
| x1, y1 | 64.66 |
| x2, y1 | 63.81 |
| x3, y1 | 62.13 |
| ... | ... |
| x16, y13 | 58.52 |
| x17, y13 | 62.18 |

Next, the Euclidean norms in Table 6 are converted to unnormalized probabilities, as described above, and then the unnormalized probabilities are normalized, in well-known fashion, to produce the probability distribution of the location of wireless terminal 201 at each of the 211 locations in geographic region 200.

Estimation As Applied to Second Report (Signal 1=−98. Signal 2=−64, and Signal 3=−50)—At task 1201, location system 212 can perfunctorily eliminate most of the candidate locations from consideration because the reported signal-strength of one of the reported signals—Signal 3=−50 dBm—is greater than the maximum reported value (−47 dBm) minus the factor for measurement errors and systematic bias (3 dBm). In other words, location system 212 can eliminate from consideration any candidate location in which $S_3$ is not at least −50 dBm. Therefore, location system 212 can restrict consideration in tasks 1202 through 1205 to those locations in signal-strength database 302 in which Signal 3 is predicted to be −50 dBm or greater. As can be seen in FIG. 10, there are only 14 locations (x8,y4; x9,y4; x10,y4; x7,y5; x8,y5; x9,y5; x10, y5; x7,y6; x8,y6; x9,y6; x10,y6; x7,y7; x8,y7; x9,y7) at which Signal 3 is predicted to be −50 dBm or stronger, and, therefore, location system 212 need only perform tasks 1202 through 1205, in the above-described fashion, on those 14 locations. By reducing the number of candidate locations that need to be processed from 221 to 14, task 1201 has greatly reduced the computational complexity of operation 403.

It is to be understood that the above-described embodiments are merely illustrative of the present invention and that many variations of the above-described embodiments can be devised by those skilled in the art without departing from the scope of the invention. It is therefore intended that such variations be included within the scope of the following claims and their equivalents.

What is claimed is:

1. A method for estimating a location of a wireless terminal, the method comprising:
    receiving a first signal-strength measurement for a first signal at the wireless terminal and a second signal-strength measurement for a second signal at the wireless terminal, wherein the first signal is transmitted by a first transmitter at a first location and the second signal is transmitted by a second transmitter at a second location that is different from the first location; and
    estimating the location of the wireless terminal by pattern matching the difference of the first signal-strength measurement minus the second signal-strength measurement against a signal-strength database that associates location with tuples of first signal signal-strength measurements and second signal signal-strength measurements.

2. The method of claim 1 wherein the first signal-strength measurement and the second signal-strength measurement are made at substantially the same time and at substantially the same location.

3. The method of claim 1 wherein the task of estimating the location of the wireless terminal comprises generating a probability distribution for the location of the wireless terminal based on the difference of the first signal-strength measurement minus the second signal-strength measurement.

4. The method of claim 1 further comprising the task of receiving a third signal-strength measurement for a third signal at the wireless terminal.

5. The method of claim 4 further comprising the task of estimating the location of the wireless terminal by pattern matching the difference of the first signal-strength measurement minus the third signal-strength measurement against a signal-strength database that associates location with tuples of first signal signal-strength measurements and third signal signal-strength measurements.

6. The method of claim 4 wherein the first signal-strength measurement and the third signal-strength measurement are made at substantially the same time and at substantially the same location.

7. The method of claim 4 wherein the third signal-strength measurement is at the maximum reportable value, and
    wherein the task of estimating the location of the wireless terminal comprises restricting candidate locations to those where the third signal-strength measurement is expected to be at least equal to the maximum reportable value.

8. The method of claim 1 wherein the task of estimating the location of the wireless terminal is performed at a location server.

9. An apparatus for estimating a location of a wireless terminal, the apparatus comprising:
    a processor for receiving (i) a first signal-strength measurement for a first signal at the wireless terminal and (ii) a second signal-strength measurement for a second signal at the wireless terminal, wherein the first signal is transmitted by a first transmitter at a first location and the second signal is transmitted by a second transmitter at a second location that is different from the first location; and
    a first signal-strength database that associates location with tuples of first signal signal-strength measurements and second signal signal-strength measurements;
    wherein the processor is also for estimating the location of the wireless terminal by pattern matching the difference of the first signal-strength measurement minus the second signal-strength measurement against the first signal-strength database.

10. The apparatus of claim 9 wherein the first signal-strength measurement and the second signal-strength measurement are made at substantially the same time and at substantially the same location.

11. The apparatus of claim 9 wherein the processor estimates the location of the wireless terminal by also generating a probability distribution for the location of the wireless terminal based on the difference of the first signal-strength measurement minus the second signal-strength measurement.

12. The apparatus of claim 9 wherein the processor is also for receiving (iii) a third signal-strength measurement for a third signal at the wireless terminal.

13. The apparatus of claim 12 further comprising a second signal-strength database that associates location with tuples of first signal signal-strength measurements and third signal signal-strength measurements;
    wherein the processor is also for estimating the location of the wireless terminal by pattern matching the difference of the first signal-strength measurement minus the third signal-strength measurement against the second signal-strength database.

14. The apparatus of claim 12 wherein the first signal-strength measurement and the third signal-strength measurement are made at substantially the same time and at substantially the same location.

15. The apparatus of claim 12 wherein the third signal-strength measurement is at the maximum reportable value, and
    wherein the processor estimates the location of the wireless terminal by also restricting candidate locations to those where the third signal-strength measurement is expected to be at least equal to the maximum reportable value.

16. The apparatus of claim 9 wherein the processor is part of a location server.

* * * * *